US012454739B2

(12) United States Patent
Elliott et al.

(10) Patent No.: US 12,454,739 B2
(45) Date of Patent: Oct. 28, 2025

(54) IDENTIFYING AND EXTRACTING RARE EARTH ELEMENTS FROM MINING OPERATIONS

(71) Applicant: Georgia State University Research Foundation, Atlanta, GA (US)

(72) Inventors: W. Crawford Elliott, Atlanta, GA (US); David Shafer, Atlanta, GA (US)

(73) Assignee: Georgia State University Research Foundation, Atlanta, GA (US)

( * ) Notice: Subject to any disclaimer, the term of this patent is extended or adjusted under 35 U.S.C. 154(b) by 200 days.

(21) Appl. No.: 18/263,440

(22) PCT Filed: Jan. 28, 2022

(86) PCT No.: PCT/US2022/070404
§ 371 (c)(1),
(2) Date: Jul. 28, 2023

(87) PCT Pub. No.: WO2022/165509
PCT Pub. Date: Aug. 4, 2022

(65) Prior Publication Data
US 2024/0076761 A1 Mar. 7, 2024

Related U.S. Application Data

(60) Provisional application No. 63/143,502, filed on Jan. 29, 2021.

(51) Int. Cl.
*C22B 59/00* (2006.01)
*B65G 15/30* (2006.01)
(Continued)

(52) U.S. Cl.
CPC ............. *C22B 59/00* (2013.01); *B65G 15/30* (2013.01); *C22B 3/22* (2013.01); *E02F 9/26* (2013.01); *E21C 35/302* (2023.05)

(58) Field of Classification Search
CPC . C22B 59/00; C22B 3/22; B65G 15/30; E02F 9/26; E21C 35/302
See application file for complete search history.

(56) References Cited

U.S. PATENT DOCUMENTS

| 5,015,847 A | * | 5/1991 | Rouillon | .................. E02F 5/00 250/361 R |
| 12,179,214 B2 | * | 12/2024 | Elliott | ...................... B03B 5/30 |

(Continued)

OTHER PUBLICATIONS

PCT Invitation to Pay Additional Fees for PCT Application No. PCT/US2022/070404, mailed Mar. 23, 2022, 2 pages.
(Continued)

*Primary Examiner* — Janine M Kreck
(74) *Attorney, Agent, or Firm* — Lee & Hayes, P.C.

(57) ABSTRACT

Described herein are technologies for bauxite or kaolin mining operations. A detector is used to detect the presence of a pathfinder element or radioactivity indicating a presence of a rare-earth element. Once the pathfinder element or radioactivity is detected, the mined material is segregated from material mined in which a pathfinder element or radioactivity was not detected. Rare-earth elements are extracted from the segregated material. Once the rare-earth elements are extracted, the material is returned to normal mining operation processing steps.

8 Claims, 3 Drawing Sheets

(51) Int. Cl.
     *C22B 3/22*           (2006.01)
     *E02F 9/26*           (2006.01)
     *E21C 35/00*         (2006.01)

(56) References Cited

U.S. PATENT DOCUMENTS

| | | |
|---|---|---|
| 2004/0045902 A1 | 3/2004 | Fellers |
| 2007/0241284 A1 | 10/2007 | Iltis |
| 2010/0319491 A1 | 12/2010 | Sugahara et al. |
| 2015/0104361 A1 | 4/2015 | Boudreault et al. |
| 2016/0177419 A1 | 6/2016 | Hatanaka et al. |
| 2020/0017366 A1 | 1/2020 | Wergertseder et al. |

OTHER PUBLICATIONS

International Search Report and Written Opinion for PCT Application No. PCT/US2022/070404. mailed May 23, 2022, 9 pages.

* cited by examiner

IDENTIFYING AND EXTRACTING RARE EARTH ELEMENTS FROM MINING OPERATIONS

CROSS-REFERENCE TO RELATED APPLICATIONS

This application is a U.S. National Stage Application of International Application No. PCT/US2022/070404 filed Jan. 28, 2022, which claims the benefit of U.S. Provisional Patent Application No. 63/143,502 filed Jan. 29, 2021, entitled "Extracting Rare Earth Elements from Bauxite Mining Operations," which are incorporated herein by reference in their entirety.

BACKGROUND

With the explosive growth of various technologies, rare-earth elements are increasingly vital to sustain that growth. A rare-earth element (REE) or rare-earth metal (REM), as defined by IUPAC, is one of a set of seventeen chemical elements in the periodic table, specifically the fifteen lanthanides, as well as scandium and yttrium. Rare-earth elements are cerium (Ce), dysprosium (Dy), erbium (Er), europium (Eu), gadolinium (Gd), holmium (Ho), lanthanum (La), lutetium (Lu), neodymium (Nd), praseodymium (Pr), promethium (Pm), samarium (Sm), scandium (Sc), terbium (Tb), thulium (Tm), ytterbium (Yb) and yttrium (Y). Heavy rare-earth metals are defined as the high atomic number lanthanide rare-earth metals: dysprosium (Dy), erbium (Er), gadolinium (Gd), holmium (Ho), lutetium (Lu), terbium (Tb), thulium (Tm), ytterbium (Yb) and includes a non-Lanthanide Yttrium (Y).

Rare-earth elements are used to build items such as batteries, permanent magnets, and displays. Rare-earth elements can also be used in various processes such as refining crude oil. An estimated distribution of rare-earth elements by end use is as follows, in decreasing order: catalysts, 60%; metallurgical applications and alloys, 10%; ceramics and glass, 10%; glass polishing, 10%; and other, 10%.

Due to the costs of extracting REES, a large percentage of REES are provided in one particular region of the world. The estimated value of rare-earth compounds and metals imported by the United States in 2015 was $150 million, a decrease from $191 million imported in 2014. Finding sources of REES and determining methods of extracting those REES are highly desirable.

The majority of REE are mined and purified in China. Given the vital role of REE in modern technology applications for US military and economic strategic purposes, it is important that sources of REE-enriched geological material be identified domestically and that methods be developed for mining, enriching, and purifying them. REEs represent a large business opportunity. Because of the role they play in providing some vital chemical underpinnings of high technology and the increasing abundance of high tech devices and applications in every area of modern life, demand for REE is rising significantly. In addition, the vast majority of REE are sourced from one country. China accounts for 87% of REE production worldwide. For strategic purposes, the US government and private sector have begun investing heavily in resources and technologies that will improve domestic production of REE. Currently, no REE are produced end-to-end in the US. Some materials containing REE are mined in the US, but currently these are typically shipped to China for processing into refined materials. Part of the market problem in the US is this current lack of refining capability, while the other part of the market problem is identifying domestic geological materials that are highly enriched in REE. As REE are by definition—rare—finding geologic materials enriched in their abundance is a vital first step in building out a profitable domestic market.

REE are valuable commodities. Some of these are clearly more valuable than gold, which has a current market value of approximately $60,000/kg. By contrast, though variable from one REE to another, the approximate values of REE are as follows:

| REE | Name | Price/Kg |
|---|---|---|
| Sc | Scandium | $170,000 |
| Y | Yttrium | $ 9,000 |
| La | Lanthanum | $ 6 |
| Ce | Cerium | $ 5 |
| Pr | Praseodymium | $ 121 |
| Nd | Neodynium | $ 108 |
| Sm | Samarium | $ 5,000 |
| Eu | Europium | $ 7,500 |
| Gd | Gadolinium | $ 19,700 |
| Tb | Terbium | $180,000 |
| Dy | Dysprosium | $ 330 |
| Ho | Holmium | $ 10,000 |
| Er | Erbium | $ 650 |
| Tm | Thulium | $ 75,000 |
| Yb | Ytterbium | $ 5,300 |
| Lu | Lutetium | $ 10,000 |

According to US Department of Energy (DOE), the 2018 annual REE market was ~$8B worldwide (https://bit.ly/3atAm2m). The US consumes about 7% of the REE produced. However, the US imports around $2.6 trillion in finished products. Of the top 4 product groups that account for 50% of imports are categories that most heavily use REE: machinery including computers: ($386.4 billion; 14.8% of total imports), electrical machinery, equipment ($367.1 billion; 14%), vehicles ($306.7 billion; 11.7%), and mineral fuels including oil ($241.4 billion; 9.2%).

It is with respect to these and other considerations that the various configurations described below are presented.

SUMMARY

Technologies are disclosed herein for identifying extracted material potentially having rare-earth elements and processes for the extraction of the rare-earth elements. In some examples, a mining operation is described wherein a detector system is used to detect a pathfinder element or radioactivity that signals a potential of rare-earth elements within a mining operation, whereby the mining operation is not directed towards mining rare-earth elements, such as a bauxite and/or kaolin mining operation. In some examples, the material is mined from argillaceous rocks (clay rich rocks, kaolins, bauxites), as may be found in sedimentary kaolin and/or bauxite ore as may be found in the Georgia Coastal Plain, for example. In some examples, the detector is used to detect compounds or elements such as phosphorus, titanium, and/or zirconium. In other examples, a detector detects radioactivity (e.g., U, Th).

The material mined from a mining operation is placed in proximate contact with or processed by a detector system. Upon the detection of the pathfinder element or radioactivity, the material is separated from material that no pathfinder element or radioactivity was detected. Once the rare-earth elements are separated from the mined and identified material, the processed material is returned and combined with the mined material that no pathfinder element or radioactivity was detected.

DETAILED DESCRIPTION

Figure 1:
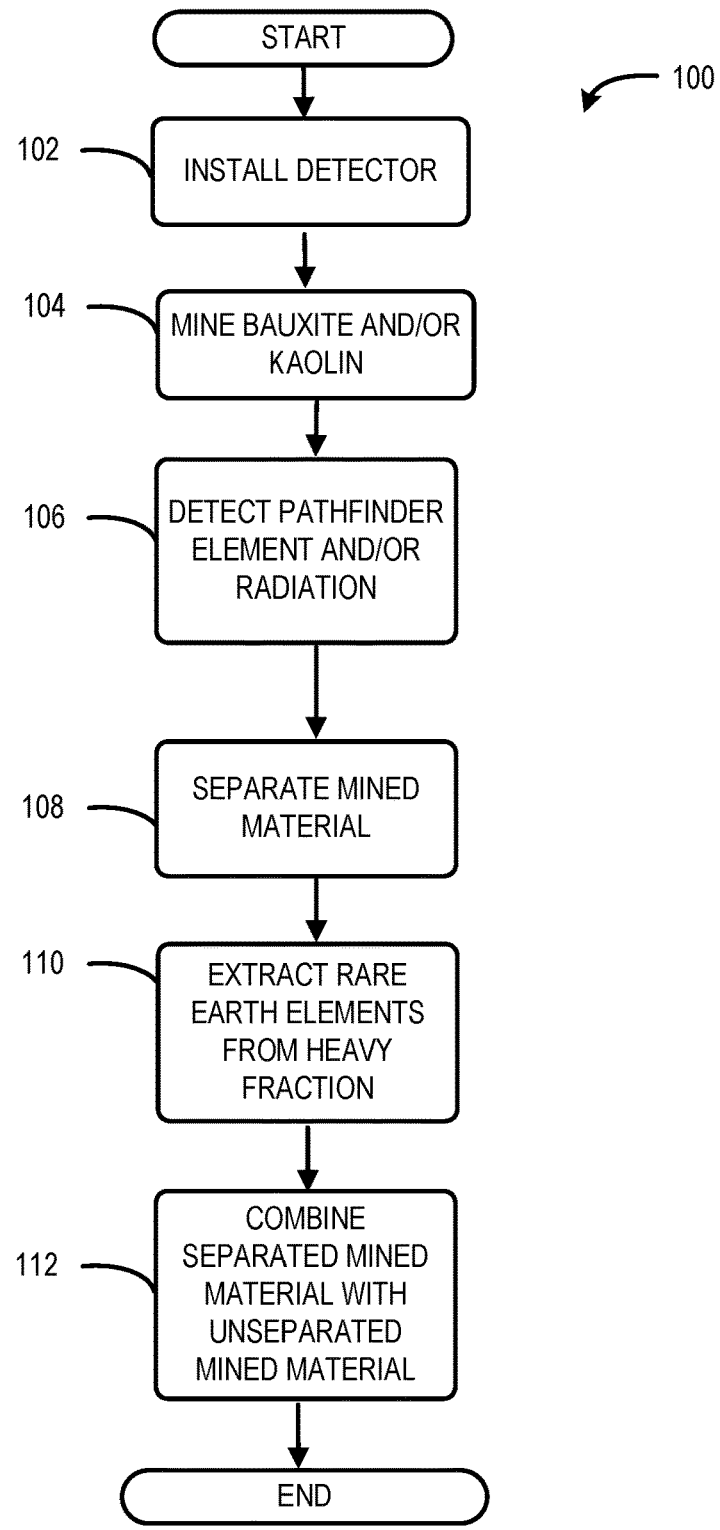
FIG. 1 is an example method for mining by identifying rare-earth elements from material produced in bauxite and/or kaolin mining.

Technologies are disclosed herein for identifying extracted material having rare-earth elements and processes for the extraction of the rare-earth elements from kaolin and/or bauxite mining operations, in some examples, from various formations, including the Cretaceous Buffalo Creek Formation and the Eocene Jeffersonville Member of the Huber Formation in Georgia, along with other formations not disclosed herein. The rare-earth elements (REE) can be found in crustal rocks in comparable concentrations to many transition elements.

Unlike the transition elements, rare-earth elements characteristically are difficult to separate from each other. The difficulty to separate the individual REE from each other is attributed to their variability only in the number of their 4f-shell electrons. These 4f electrons are shielded from interacting with electron clouds of other atoms by shells of 5d, and 6s electrons. Many transition metals, on the other hand, have variable geochemical behavior due to their d-shell electrons being able to participate in oxidation/reduction processes occurring during the formation and subsequent alteration of crustal rocks (sedimentary, igneous and metamorphic) at crustal pressure-temperature conditions. The rare-earth elements are divided informally into the light rare-earth elements (Sc, La—Eu, LREE) and the heavy rare-earth elements (Gd—Lu, Y, HREE). There is no agreed dividing point between the LREE and the HREE. Most crustal rocks are enriched in the light rare-earth elements, thus finding heavy rare-earth elements is important and profitable.

In some examples, bauxite and kaolin mining operations may be modified to identify and extract REES. Bauxite and kaolin ores are typically hosted in sedimentary rocks. Georgia Coastal Plain Kaolin and bauxite are potential target rocks for mining the REE. The REE in these rocks are found within highly insoluble and mature (mineralogically) minerals. Bauxites and kaolins result from the deposition of kaolin and bauxite grains, later reworking, concentration of these grains, and removal of more soluble minerals. In an example in which REES may be found in mined material, the minerals containing the REE in the Georgia Coastal Plain kaolins and bauxites are phosphate minerals (Monazite, Xenotime) and zircon.

It should be noted that phosphates and zircon can contain Uranium (U) and Thorium (Th). U and Th contribute to the radioactivity measured for kaolins and bauxites in the inner Coastal Plain. A survey of radioactivity can be used to spot layers enriched in U and possibly the REE. The sum of U and Th in the heavy subfraction of kaolins is approximately 500-600 ppm (approaching the need to handle as a Class 7 material). The heavy mineral sand products from the heavy mineral sands in southern GA are transported Class 7 shipments due to their abundances of U and Th.

The REE, trace elements, and select major elements (Ti, P) are found in minerals that are moderately insoluble in water. Since zircon, rutile, phosphate minerals are resistant to chemical and physical attack, they are called mature minerals. Kaolinite and bauxite likewise are minerals formed from the chemical and physical weathering of bedrock. They are the final mineral products formed from the weathering of felsic (Si, Al—granite) and mafic bedrock (Fe, Mg—basalt). The kaolin and bauxite clay layers are considered residual clays from extensive weathering of bedrock, the transport of those weathering products to the Coastal Plain, and later in-situ weathering after deposition. Consequently, bauxite and kaolin ore contain considerable amounts of Al, Si, and Ti in the form of mature minerals. Weathering indices given as molar ratios [(sum of alkali oxides/$Al_2O_3$+$SiO_2$+$Fe_2O_3$); ($SiO_2$/$Al_2O_3$)] are much higher in the unweathered parent rocks compared to the weathered kaolin and bauxite products of that bedrock. Additionally, kaolins and bauxites would contain higher abundances of mature minerals (some containing the REE) and lower values of weathering indexes. Ti, Zr, P would serve as elemental pathfinders for phosphate, zircon and rutile/anatase. These elemental signals would signify beds with high potentials for finding REE.

Phosphate minerals, likely carriers of the REE, are somewhat soluble. Ion-sorbed REES have been discovered in laterites (regolith formed on granites) in SE China and in the regolith of the Liberty Hill Pluton (SC). These REE are sorbed on mineral surfaces and released in the presence of a lixiviant (Ammonium sulfate). They are found as an ion-sorbed constituent near the contact between weathered rock and overlying soil that are formed from the weathering of granites.

REES are typically associated with phosphate minerals (monazite and xenotime), allanite [$(Ce,Ca,Y,La)_2(Al,Fe^{+3})_3$ $(SiO_4)_3(OH)$], titanite ($CaTiSiO_5$), and bastnasite [$(Ce, La)CO_3F$]—all these minerals being found in Piedmont weathered rocks. The phosphate minerals, and titanite can be considered mature minerals in that they were likely co-deposited with other mature minerals (zircon and rutile) and clays to form these bauxites and kaolins. The phosphate minerals may have been dissolved and reprecipitated into other secondary phosphate minerals after deposition. The dissolution and precipitation might result in the presence of ion-sorbed REE in these units. Mineral pathfinders leading to the extraction of the REE are zircon, phosphate minerals (both primary monazite, xenotime and secondary phosphate minerals). A weathering index can be constructed to show the presence of P in the kaolins and bauxites and thus point to increased P and REE in the kaolins and bauxites relative to the contents of P in parent rocks. Further, the phosphates and zircon contain U and Th. Radioactivity measurements can point to the presence of phosphates and zircon. Beds containing high REE can be seen using a weathering index that includes P.

Bauxite layers that are enriched in the HREE is counter to what would normally be expected for the crustal rocks—crustal rocks being known to be enriched in the LREE. After identifying bauxite and kaolin units showing enrichments in the HREE, then these units can be dissected further to find the mineral carriers of the REE. This work would involve the separation of the coarse fraction (>45 microns, 325 mesh) from the fine fraction (<45 microns). The heavy and light mineral subfractions can be obtained from these coarse and fine fractions. In the case of REE that is ion-sorbed in these materials, then the coarse and fine fractions can be exchanged with an appropriate lixiviant (ammonium sulfate) or ion-exchange solution. Knowing the mineral carriers for the REE would dictate the type of separation technique to extract these REE from their mineralogic hosts. Geological processes that concentrate a given REE-bearing mineral conceivably create a bauxite or kaolin deposit that can be enriched in the LREE or HREE depending on the presence of monazite and xenotime. Enrichments of the HREE are particularly sought after given their importance in in many technologies and the few number of HREE—enriched deposits. Some of the REES have been defined as potentially being inseparable. Geological processes concentrating certain REE minerals have produced significant enrichments in the LREE or HREE.

The first step in a process for extracting REE would be to find sedimentary layers having relatively larger amounts of these phosphates and zircon. These minerals are mineralogically mature minerals. They are resistant to chemical and physical breakdown that take place during the weathering of the source bedrock, their transport as detrital grains in rivers, streams, and the resistance to chemical weathering processes after they were deposited as sedimentary layers and placers of heavy minerals.

Separations may be performed using various technologies and methods, such as gravity separation, Handpicking, Threshing, Winnowing, Sieving, Evaporation, Distillation, Filtration, or Sedimentation, or a Separating Funnel. Other techniques can be used, including, but not limited to, acid dissolution, electromagnetic separation following pulverization, leaching w/microbes, and the like.

FIG. 1 is a flow diagram showing one illustrative method 100 for extracting rare-earth elements during a mining operation, in accordance with various aspects of the presently disclosed subject matter. As noted above, mining operations described herein are mining operations that are not directed towards the extraction of rare-earth elements, but rather, are mining operations directed to other material such as bauxite and/or kaolin.

In FIG. 1, the method 100 begins at operation 102, where a detector is installed on a mining work machine, described in more detail in FIGS. 2 and 3, below. The work machine can be an excavator, a conveyor belt, a truck, or any other equipment that may come in proximate contact with mined material. The detector can be a in situ detector, whereby the detection occurs at the location of mined material, such as a bucket for an excavator or an area above the conveyor belt. In other examples, the detector can be ex situ, whereby a sample of the mined material is taken to a special testing facility. The presently disclosed subject matter is not limited to any particular configuration. Further, it should be noted that more than one detector may be used, as well as using both an in situ and ex situ detector.

The method 100 continues to operation 104, where bauxite and/or kaolin are mined. In some examples, the material is mined from argillaceous rocks (clay rich rocks, kaolins, bauxites), as may be found in sedimentary kaolin and/or bauxite ore as may be found in the Georgia Coastal Plain, for example.

The method 100 continues to operation 106, where a detector detects a pathfinder element and/or radiation. As noted above, bauxite and kaolin ore can contain considerable amounts of Al, Si, and Ti in the form of mature minerals. In some examples, Ti, Zr, and/or P can be used as elemental pathfinders for phosphate, zircon and rutile/anatase. These elemental signals signify beds with high potentials for finding REE. The detectors used can be detectors that allow for the continuous flow of material, such as laser induced breakdown spectroscopy (LIBS). The LIBS is calibrated to provide an output upon the detection of a particular element within the moving mined material on a conveyor belt or stationary material such as in a truck or an excavator bucket. In some examples, radioactivity may be used to indicate the potential of REES.

The method 100 continues to operation 108, where the mined sample with the detected pathfinder element or radioactivity is separated from mined material not having a pathfinder element or radioactivity.

The method of 100 continues to operation 110, where the mined and separated material is processed to extract and separate the potential REES from the mined material. There are various processes, both chemical and physical, that may be used to separate the REES. In the instance of a kaolin mining operation, grit (composed of sand and silt) is separated from a clay fraction that comprises the mined kaolin ore. In some examples, the gangue is separated from the raw kaolin by blunging followed by de-gritting (e.g. settling). In some examples, gangue is crushed (manually disaggregated). The crushed gangue is mixed with a water/Na-hexametaphosphate solution, placed in a blender, such as a Waring Blender, and blunged. This blunging process helps to disperse the clay from the grit. The grit is allowed to settle and is separated from the clay by pouring off the clay solution. In some examples, the clay solution can be further processed as kaolin clay.

The grit that was separated from the clay is screened. In some examples, the grit is screened using with a 325 mesh sieve (44 micron) to collect the sand and silt fraction. In some examples, the fraction less than 325 mesh (44 micron) is discarded. The sand and silt fractions which remain are washed and taken for a second blunging process. A soda ash ($NaCO_3$)/Na-hexametaphosphate solution is mixed in the dispersal solution for a second blunging. This mixture is then sieved and washed. The washed material is then oven dried, in some examples at 50° C.

An example of operations is as follows. Raw kaolin is collected. The raw kaolin is crushed and mixed with water and CALGON solution. 5 #/ton of CALGON solution is added until the mixture is approximately 0.25 wt. % CALGON (on dry chemical weight/dry clay wt. basis). The first blunging operating is performed in a large industrial blender. The mixture is then screened through a 325 mesh (44 micron) sieve. The material which does not pass through the sieve is collected for a second blunging. The second blunging is done with CALGON and soda ash solution. The same concentration of CALGON is used for the second blunging (0.25 wt % or 5 #/ton). 1 #/ton (0.05 wt %, on dry chemical weight/dry clay wt. basis) soda ash is added to the mixture for the second blunging. A Waring Blender is used in the second blunging. The mixture is passed through a 325 mesh sieve. The material which does not pass through the sieve is collected. The >44 micron material is dried at 50 degrees C. for approximately an hour until dry.

The grit is separated into a light mineral grit fraction and a heavy mineral grit fraction using a heavy or dense liquid medium. In some examples, lithium metatungstate ($\rho$=2.95 Kg/L) is used. However, the presently disclosed subject matter is not limited to the use of lithium metatungstate. In some examples, other heavy liquids or heavy mediums (such as a magnetite-water slurry) can be used. Some examples of other heavy liquids include, but are not limited to, bromoform, tetrabromoethane (TBE), sodium polytungstate, and LST Heavy Liquid. In some examples, the grit is mixed with the lithium metatungstate in a separatory funnel. The mixture is allowed to separate, allowing higher density solids (the heavy mineral grit fraction) to settle at the bottom and lower density solids (the light mineral grit fraction) float to the top. The heavy mineral grit fraction is filtered and washed to remove remaining heavy liquid. In some examples, various rare-earth elements are in the heavy mineral grit fraction.

The rare-earth elements are extracted from the heavy mineral fraction of the grit. The rare-earth elements may be extracted using various technologies, including thermal treatment of the heavy mineral grit fraction in acidic or caustic reagents. In some examples, acid baking may be used whereby the heavy mineral grit fraction is mixed with concentrated sulfuric acid and baked at temperatures between 200° C. and 400° C. for several hours. The resulting cake is leached with water to dissolve rare-earth elements as sulfates. Other methods such as decomposition in hydrochloric acid may be used depending on the particular rare-earth elements contained within the heavy mineral grit fraction. It should be noted that similar separation processes may be used in bauxite mining operations.

The method 100 continues to operation 112, where, in an optional step, the mined material from which REES were extracted is combined back with the mined material from which no REES were extracted. The method 100 may thereafter end.

Figure 2:
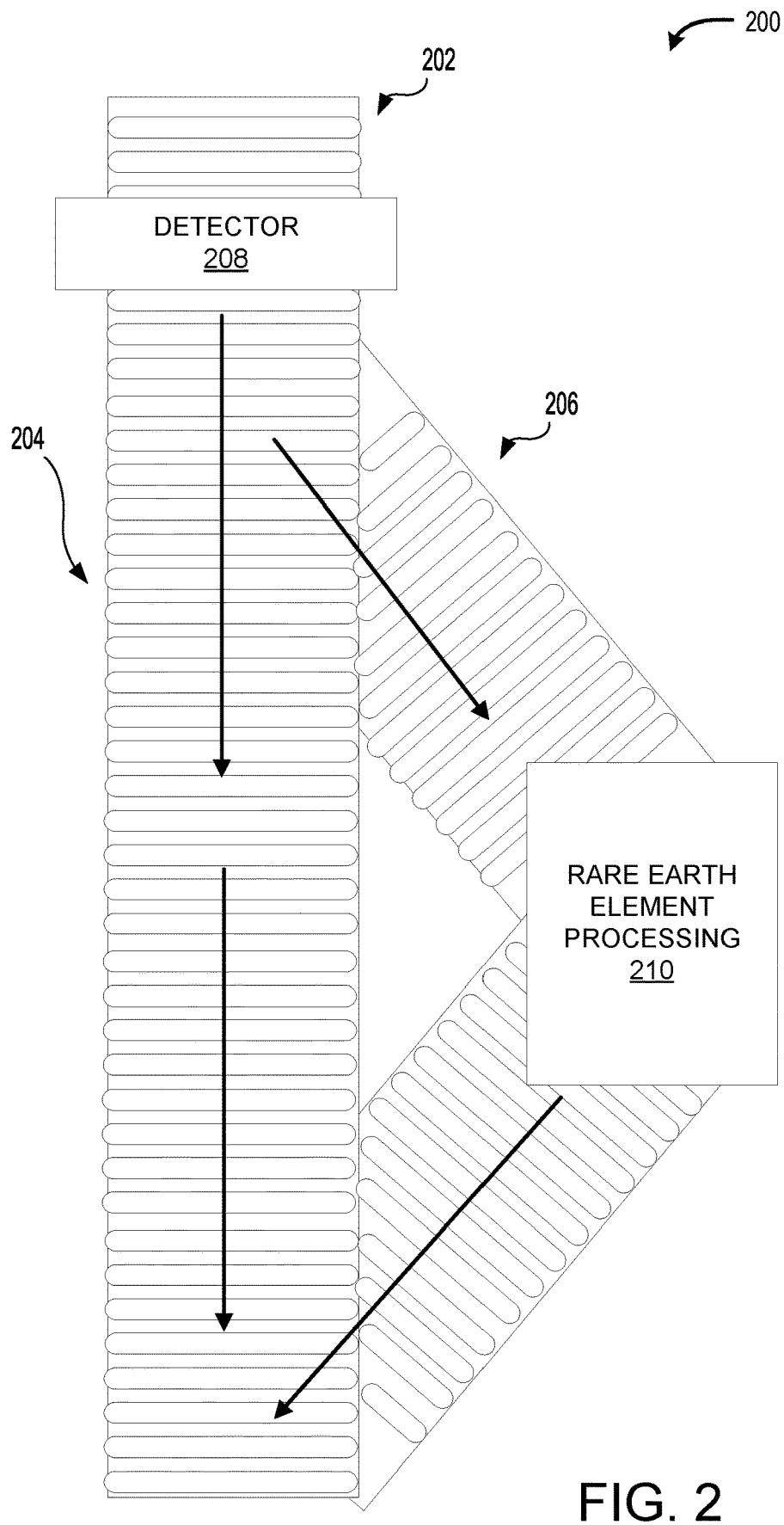
FIG. 2 is an example conveyor system for moving mined material through an identification process.

FIG. 2 is an example conveyor belt system 200, mining equipment that may be used to identify and extract REES, in accordance with various examples of the presently disclosed subject matter. The conveyor belt system 200 may be used to transport mined material from a mining operation to another location. The conveyor belt system includes a conveyor belt 202. The conveyor belt 202 includes a primary line 204 and an extraction line 206. The primary line 204 moves mined material in the direction indicated in FIG. 2 to a receiving area. The extraction line 206 is used to move a portion of mined material in which a pathfinder element or radioactivity has been detected, indicating the potential presence of REES. A detector 208 is positioned at location prior to the location of the entry of the extraction line 206 so that material can be moved from the primary line 204 onto the extraction line 206 if a pathfinder element or radioactivity has been detected, indicating the potential presence of REES.

A detector 208 is installed at a location along the primary line 204. As noted above, the detector can be an in situ detector such as a laser induced breakdown spectroscopy (LIBS). The LIBS is calibrated to provide an output upon the detection of a particular element within the moving mined material on the conveyor belt 202. The detector 208 can also detect radioactivity, indicating a potential presence of REES. Once material is moved to the extraction line 206, the material is processed at a rare-earth element (REE) processing unit 210. The REE processing unit 210 can perform various extraction processes, such as those described by way of example in FIG. 1, to extract REES from the material. Once the REES are extracted, the material is moved back onto the primary line 204 for further processing of the material intended for the mining operation.

Figure 3:
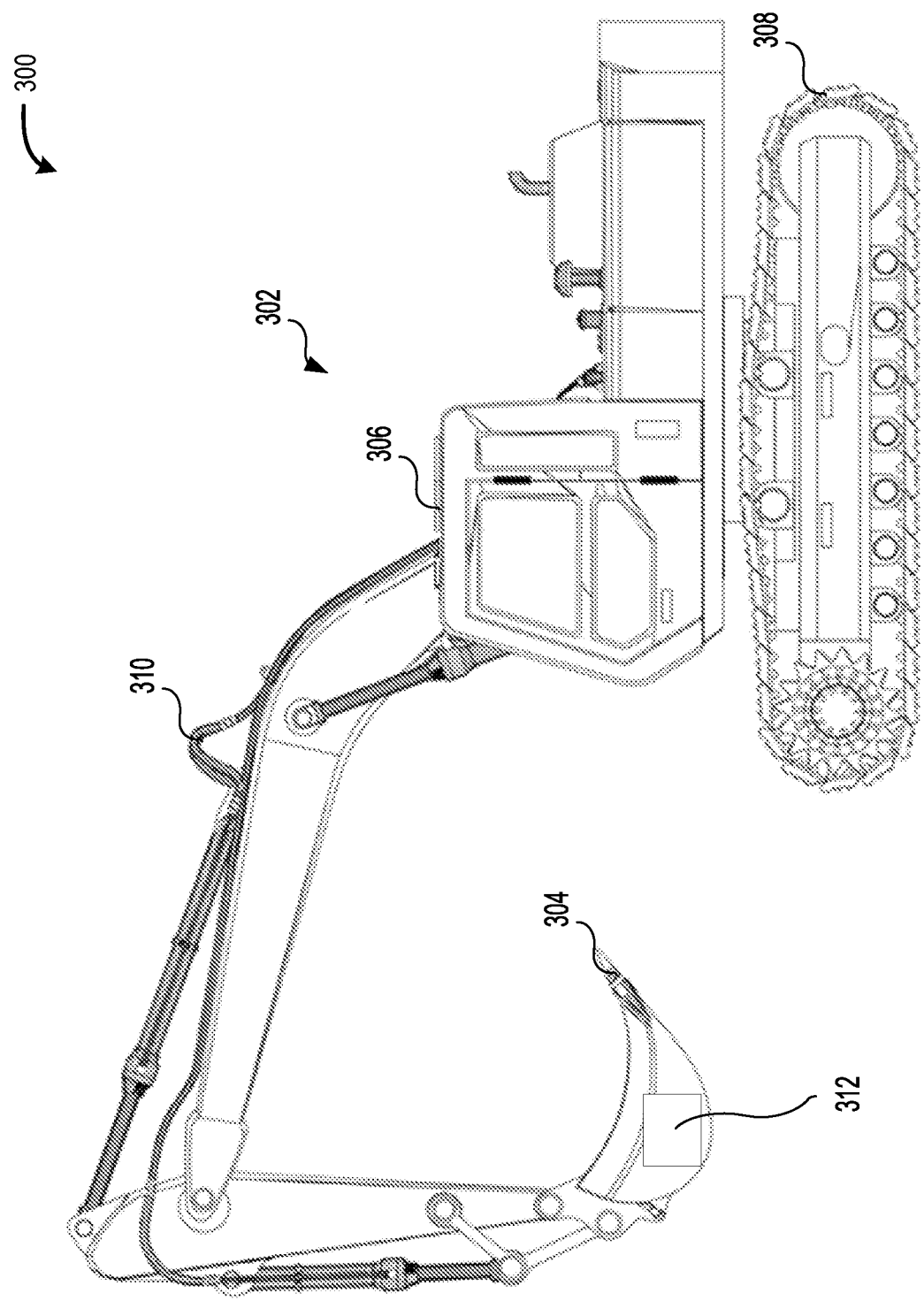
FIG. 3 is an example work machine for identifying pathfinder elements or radioactivity for identifying material potentially having rare-earth elements.

FIG. 3 is an example mining system 300 for the detection of a pathfinder element or radioactivity. In FIG. 3, a work machine 302 is illustrated. The work machine 302 in FIG. 3 is a digger or excavator that uses a bucket 304 to pull material from the ground or earth into the work machine 302. The work machine 302 includes a body section 306 in which motors, pumps, and electrical equipment are used by an operator of the work machine 302 to manipulate systems of the work machine 302, such as tracks 308 for moving the work machine 302 along the ground of the Earth and lifter arm 310 for moving the bucket 304.

Attached to a surface of the bucket 304 is detector 312. The detector 312 can be a detector such as a laser induced breakdown spectroscopy (LIBS) that is calibrated to provide an output upon the detection of a particular element or a radioactivity detector that detects radioactivity within the mined portion. Upon the detection of a particular element or a specific radioactivity, the detector 312 sends a signal to an operator of the work machine 302 to segregate material in the bucket 304 from material that no particular element or a specific radioactivity has been detected.

Based on the foregoing, it should be appreciated that technologies have been described herein for extracting (concentrating) rare-earth elements from the mining of bauxite or kaolin. The various configurations described above are provided by way of illustration only and should not be construed to limit the disclosed subject matter. Those skilled in the art will readily recognize various modifications and changes that can be made to the presently disclosed subject matter without following the example configurations and applications illustrated and described herein, and without departing from the true spirit and scope of the invention, which is set forth in the following claims.

What is claimed is:

1. A method of extracting rare-earth elements from a mining, the method comprising:
    using a detector on mining equipment;
    receiving material mined from a mining operation, the material comprising bauxite or kaolin;
    detecting using the detector a pathfinder element or radioactivity;
    separating the material into a first material comprising the pathfinder element or radioactivity and a second material not having the pathfinder element or radioactivity; and
    extracting at least one rare-earth element from the first material.

2. The method of claim 1, wherein the pathfinder element comprises phosphorus.

3. The method of claim 1, wherein the pathfinder element comprises titanium, or zirconium.

4. The method of claim 1, wherein the radioactivity indicates Uranium or Thorium, (U-235, U-238, Th-232).

5. The method of claim 1, further comprising:
    crushing the kaolin to create crushed kaolin;
    mixing the crushed kaolinite in a solution of water and a Na-hexametaphosphate;
    allowing a grit portion of the crushed kaolin to settle;
    separating the grit portion into a light grit fraction and a heavy grit fraction comprises mixing the grit into a heavy liquid mixture in a container;
    allowing the heavy grit fraction to settle at a bottom of a container and the light grit fraction to rise to a top of the heavy liquid mixture comprising a heavy liquid, wherein the heavy liquid comprises lithium metatungstate, and wherein the heavy liquid comprises at least one of bromoform, tetrabromoethane (TBE), sodium polytungstate, or lithium metatungstate (LMT) Heavy Liquid; and
    extracting the at least one rare-earth element from the heavy grit fraction by performing thermal treatment of the heavy grit fraction or acid baking of the heavy grit fraction.

6. The method of claim 1, wherein the at least one rare-earth element comprises cerium (Ce), dysprosium (Dy), erbium (Er), europium (Eu), gadolinium (Gd), holmium (Ho), lanthanum (La), lutetium (Lu), neodymium (Nd), praseodymium (Pr), promethium (Pm), samarium (Sm), scandium (Sc), terbium (Tb), thulium (Tm), ytterbium (Yb) or yttrium (Y).

7. The method of claim 1, wherein the material is mined from a mining operation in Georgia Coastal Plain.

8. The method of claim 1, wherein the material is mined from a mining operation in Jeffersonville Member of a Paleocene-Eocene Huber Formation.

* * * * *